United States Patent [19]

Mohl

[11] Patent Number: 4,621,545
[45] Date of Patent: Nov. 11, 1986

[54] METHOD AND APPARATUS FOR CONTROLLING AN AUTOMOTIVE DRIVE SYSTEM WITH FREE-WHEELING

[75] Inventor: Helmut Mohl, Schwieberdingen, Fed. Rep. of Germany

[73] Assignee: Robert Bosch GmbH, Stuttgart, Fed. Rep. of Germany

[21] Appl. No.: 709,361

[22] Filed: Mar. 8, 1985

Related U.S. Application Data

[63] Continuation of Ser. No. 424,251, Sep. 27, 1982, abandoned.

[30] Foreign Application Priority Data

Feb. 5, 1982 [DE] Fed. Rep. of Germany ....... 3204002

[51] Int. Cl.$^4$ ............................................. B60K 41/06
[52] U.S. Cl. ...................................... 74/866; 74/878; 192/0.075; 192/0.076
[58] Field of Search .................... 74/858, 866, 878; 192/0.076, 0.075, 0.055, 0.094, 0.096, 0.082, 3 M; 364/424.1

[56] References Cited

U.S. PATENT DOCUMENTS

| | | | |
|---|---|---|---|
| 4,084,672 | 4/1978 | Avins | 192/0.055 |
| 4,172,505 | 10/1979 | Rabus et al. | 74/862 X |
| 4,295,551 | 10/1981 | Zimmerman et al. | 74/866 X |
| 4,319,501 | 3/1982 | Sugimoto | 74/866 |
| 4,344,513 | 8/1982 | Etienne | 192/0.052 X |
| 4,350,234 | 9/1982 | Suga et al. | 192/0.055 X |
| 4,363,389 | 12/1982 | Zaunberger et al. | 192/0.055 X |
| 4,408,293 | 10/1983 | Avins | 364/424.1 X |
| 4,418,810 | 12/1983 | Windsor | 192/0.076 |

FOREIGN PATENT DOCUMENTS

| | | |
|---|---|---|
| 2848624 | 5/1980 | Fed. Rep. of Germany . |
| 2934477 | 4/1981 | Fed. Rep. of Germany . |
| 54-15225 | 2/1979 | Japan .................................. 192/0.076 |

*Primary Examiner*—Kenneth J. Dorner
*Assistant Examiner*—Dwight G. Diehl
*Attorney, Agent, or Firm*—Frishauf, Holtz, Goodman & Woodward

[57] ABSTRACT

To prevent jolts or shocks interfering with smooth operation of an automotive vehicle upon disengagement of an automatic free-wheeling arrangement and reestablishment of engine braking, a control element (22, 23) is provided, controlled by the system, typically coupled to the brake light switch, which reestablishes positive drive connection between engine and wheels to permit engine braking, to reduce the torque supplied by the engine at the re-engagement instant, to thereby insure smooth transition from free-wheeling to engine braking. Preferably, the engine speed is sensed, and the speed of the shaft beyond the free-wheeling arrangement is sensed (points A, B), and engine torque is reduced just before synchronism is achieved.

18 Claims, 1 Drawing Figure

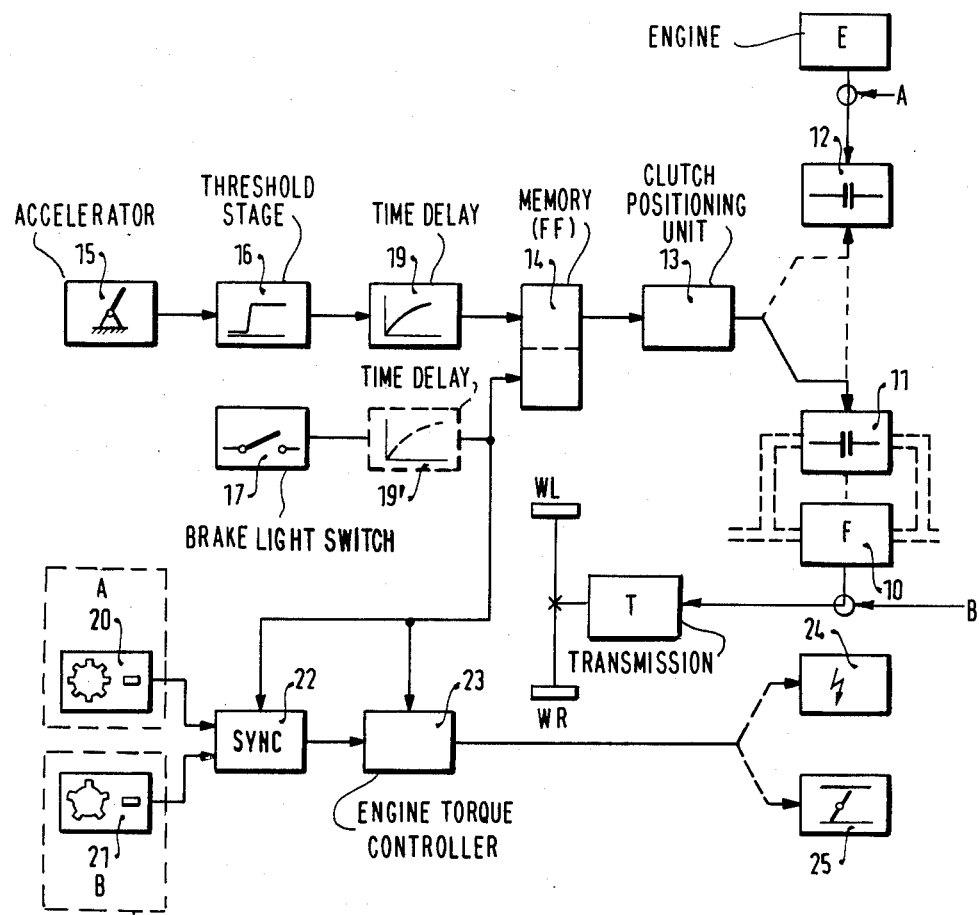

METHOD AND APPARATUS FOR CONTROLLING AN AUTOMOTIVE DRIVE SYSTEM WITH FREE-WHEELING

This application is a continuation, of application Ser. No. 424,251, filed 9/27/82 now abandoned.

Reference to related patent and application:

U.S. Pat. No. 4,084,672, AVINS.

U.S. application Ser. No. 06/398,349, filed July 15, 1982, now U.S. Pat. No. 4,509,628, issued Apr. 9, 1985 JUNGINGER, assigned to the assignee of the present invention, the disclosures of the two foregoing are hereby incorporated by reference.

Reference to related technical publications: German Patent Disclosure Document DE-OS No. 28 48 624; , to which U.S. Pat. No. 4,266,447 corresponds German Patent Disclosure Document DE-OS No. 29 34 477 to which U.S. Pat. No. 4,370,903 corresponds.

The present invention relates to a drive system for automotive vehicles, and more particularly to a drive system which includes a drive train in which a free-wheeling arrangement is provided which interrupts positive drive connection between the engine and the gear transmission to permit the fuel saving inherent in free-wheeling operation without, however, continued free-wheeling if engine braking is desired; and, more particularly, to such a system which includes an arrangement providing for improved operator or passenger comfort.

BACKGROUND

It is known to provide free-wheeling arrangements within the drive train of automotive vehicles in which engagement or disengagement of a free-wheeling feature is controlled in dependence on operation of the accelerator and the brake pedal, respectively, by the vehicle operator. Such a drive system is described, for example, in the referenced U.S. Pat. No. 4,084,672.

The referenced application Ser. No. 06/398,349, filed July 15, 1982, now U.S. Pat. No. 4,509,628 JUNGINGER, entitled "VEHICULAR DRIVE SYSTEM", assigned to the assignee of the present application, describes a system in which signals controlling the free-wheeling transmission are averaged with respect to time in order to control engagement and disengagement of the free-wheeling feature independent of short-time or transient conditions, so that the free-wheeling feature is engaged only if it is actually desired, and if it is economically appropriate.

It has been found that engagement and disengagement of a free-wheeling feature in transmissions may, under some operating conditions, cause shifting or gear switching jolts, which are undesirable for smooth vehicle operation, and detract from operator and passenger comfort in the operation of the vehicle.

Under free-wheeling operation, the transmission gears, and the transmission gear input shaft coupled thereto will operate at a speed which is higher than engine speed since, it is assumed, that under freewheeling operation the engine will be under idling condition. To establish synchronism and to reduce coupling jolts, the automatic system, therefore, provides fuel to the engine to accelerate the engine such that its output shaft will approach and reach synchronism with the input shaft of the transmission. As synchronism is obtained, the automatic system loses control, disabling of free-wheeling, normally, is commanded by operation of the brake, so that the operator will not provide fuel for continuous engine operation at higher, that is, synchronous transmission speed. A coupling jolt may result due to the sudden transition of engine operation from accelerating mode to engine braking mode.

THE INVENTION

It is an object to provide a free-wheeling engagement and disengagement control system which insures maximum passenger and operator comfort, while retaining the advantages of the system described in the referenced JUNGINGER application Ser. No. 06/398,349 now U.S. Pat. No. 4,509,628.

Briefly, a sensing signal is derived if the free-wheeling feature is to be disabled, that is, if the vehicle, while in free-wheeling condition is to be changed over to positive drive condition; and, upon deriving such a sensing signal, the engine torque or engine power, respectively, is reduced. Reduction of engine power can be obtained, easily, for example by retarding ignition spark, reducing fuel supply, or the like, as well known, and in accordance with well known systems.

The arrangement has the advantage that, upon disengagement of the free-wheeling feature and re-engagement of positive drive connection, a soft transition to positive drive is obtained, since the engine torque is reduced for a short period of time. Shifting or gear engaging jolts and shocks are thus eliminated, which, otherwise, might occur upon re-engaging of a positive drive connection, similar to a sudden release of a clutch while an engine is operating under high-power output.

Particularly soft engagement of positive drive connection upon disengagement of the free-wheeling feature is obtained if the engine torque is decreased shortly before synchronous operation between the input speed of the transmission and the output speed of the engine is obtained.

The system additionally has the advantage that it can be applied to various types of free-wheeling control systems, for example free-wheeling systems incorporated in a transmission, clutch controls, and in automatic as well in manually operated transmissions.

DRAWING

The single FIGURE illustrates a block circuit diagram of the system in accordance with the present invention.

DETAILED DESCRIPTION

An engine E is connected through a clutch 12 to an overrun free-wheeling gearing 10, which can be positively bridged by a clutch 11. The drive train further includes a transmission T which, in turn, is connected through a differential to right and left wheels WR, WL of a vehicle.

It is not necessary that the system include both the clutch 12 as well as the overrunning gear 10 and the bridging clutch 11; either one only is necessary, although both may be used. Control, in accordance with the present invention, may be applied to both the clutch 12 as well as the bridging clutch 11, in alternate engagement—as schematically illustrated by the full-line and broken line position from clutch positioning unit 13 to the clutch 12 and the positive drive clutch 11; only one such connection, however, is required to the respective element.

Free wheeling can be obtained by providing an overrunning gear 10, as well known, which is bridged by a positive drive clutch 11. Free wheeling, also, can be obtained by disconnecting the positive drive train between the engine E and the transmission T by a disengagement clutch, usually present in manually controlled transmissions. The overrunning free-wheeling feature is usually present in automatic transmission, but may, also, be used with manual transmissions. The separating clutch 12 can be the usually customarily provided operating clutch of a manual transmission, which is operator-controlled; or the clutch 12 may represent the engagement bands and/or clutches of an automatic transmission, which is operator-controlled; or the clutch 12 may represent the engagement bands and/or clutches of an automatic transmission, which are suitably controlled by a control system, for example as described in the referenced U.S. Pat. No. 4,084,672.

Definitions: "Engagement" of the free-wheeling feature means that the wheels WL, WR can overrun the speed of the drive shaft at point B; under such condition, the clutch 12 would either be disengaged, and/or the clutch 11 would be open or disengaged. "Disengaged" free-wheeling operation describes the operating state in which the clutch 12 and/or the clutch 11 are closed, so that a fixed, positive drive connection will be established between point A and point B, that is, between the engine and the transmission. Thus, under these operating conditions, engine braking will be possible since, if the wheels tends to run faster than the power being supplied by the engine permits, the engine will have a retarding effect on the wheels.

Clutches 11, 12 are controlled by a clutch positioning unit 13 which, in turn, is controlled from a memory 14. Memory 14, for example, can be constructed in form of a flip-flop (FF) circuit. The FF 14 is SET if an appropriate control signal is derived from the accelerator pedal 15, controlled by the operator. The accelerator pedal 15 is connected through a first threshold stage 16 and a time delay unit 19 to the SET input of FF 14. The memory 14 is RESET if a signal is derived which is indicative that the vehicle is to be decelerated or braked. Such a signal indicative of imminent vehicle retardation due to operation of the brake in a simple way, is obtained from the brake light switch 17, and connected to the reset terminal of FF 14. Other similar signals can be used or installed. For example, to indicate vehicle acceleration, a signal can be derived from the throttle position or from a fuel injection system; vehicle deceleration or braking can be derived other than from a brake light switch.

The first threshold stage 16 is so arranged that it will deliver a positive or 1-signal when the accelerator pedal 15 is moved away from idle or non-operated position. This causes, after a time delay determined by delay circuit 19, the memory FF to be SET, thus opening clutch 11 (or clutch 12, or both, as the case may be), and thereby activating the free-wheeling mode of operation. The delay element 19, included in the connection between the first threshold switch 16 and the memory 14, together with the delay element 19' between the brake light switch and the reset terminal of the memory 14, prevents transient setting and resetting of the FF 14. Brake light switch 17 is further connected through time delay element 19' to an engine controller 23 and to a synchronization stage 22. The delay times of the two delay elements 19, 19' may be the same, for example 1-3 seconds, or different, preferably within the range of 1-3 seconds. The delay elements are provided to cause engagement of the free-wheeling feature only if the accelerator pedal is moved away from idle position for a time which is in excess of a momentary operation, and disengagement of the free wheeling feature only if the brake is operated for actual braking purposes, rather than merely being tapped, for example, in order to indicate to a following driver that the vehicle is decelerating.

The drive system of the FIGURE thus retains the free-wheeling mode of operation of leaving the overrunning gear 10 in operation if the operator or accelerator pedal 15 is deflected beyond a predetermined position—for example idling—and remains operated for the minimum time in excess of the time delay 19. This free-wheeling operation is disabled as soon as the brake is operated for actual braking functions; after release of the brake, and subsequent operation of the accelerator pedal, the vehicle will again then be placed in the free-wheeling operating mode.

Other types of free-wheeling control systems may be used, and the arrangement in accordance with the present invention permits association with any type of free-wheeling system, and particularly in such systems in which a clutch 12 is used which may be controlled by engagement and disengagement conditions independent of those based on a logical arrangement, as provided by signals from the delay circuits 19, 19', for example upon operator controlled operation.

Engine braking will be effective as soon as the free-wheeling mode is disabled, i.e. positive drive re-established. Upon re-engagement of the clutch 12, or overriding the overrunning gear 10 by the clutch 11, engine braking will become effective, and the sudden transition from free-wheeling operation to engine braking can be felt as a jolt by passengers and operators of the vehicle. This decreases riding comfort.

In accordance with the present invention, the engine torque is reduced at the instant of effecting engine braking i.e. upon re-establishment of positive drive in order to obtain a softer or more gradual transition between free-wheeling and braking mode of operation. Arrangements to decrease the engine torque upon switching conditions in stepped gear transmissions are well known and described in the literature, see for example U.S. Pat. No. 4,266,447, corresponding to German Patent Disclosure Document DE-OS No. 28 48 624, or U.S. Pat. No. 4,370,903, corresponding to DE-OS No. 29 34 477.

Reducing engine torque is controlled by sensing engine or speed by a speed transducer 20 providing an engine speed output signal, positioned, for example, at point A, and sensing output speed of the respective free-wheeling arrangement or clutch 12 or, which is the same, transmission input speed at point B by an a transmission speed sensor 21. The sensors 20, 21 are connected to a coincident or synchronizing stage 22. The synchronizing stage provides an output signal when the speed of the engine and of the output from the free-wheeling transmission has a predetermined relationship. The output from the synchronizing stage 22 is connected to an engine torque controller 23 which, in turn, provides a positioning control output to the engine, for example by controlling the quantity of fuel being supplied by positioning the throttle 25, or by retarding ignition, as schematically indicated by block 24, representative of an ignition system which has an ignition retardation apparatus, for example an electronic ignition in which the spark can be electrically retarded. The synchronizing stage 22 and the engine torque controller 23 are controlled in dependence on disabling of the free-wheeling feature or mode, for example by receiving an output signal from the time delay element 19' controlled by the brake light switch 17 which also causes resetting of the memory FF 14.

Synchronous operation of the shaft from the engine at point A and the shaft from the free-wheeling mode at point B is determined by the synchronizing stage 22 which, in turn, then controls the engine torque controller if the engine speed, as measured at point A, transmission speed as measured at point B, or has a predetermined relationship thereto, for example only a given and small percent difference. This is the time when free wheeling is disabled and engine braking will take effect. In that instant, the synchronizing stage 22 provides an output to the engine torque controller to reduce output torque from the engine E by, respectively, retarding the spark of ignition system 24 or reducing fuel supply to the engine. Regardless of the torque reduction method utilized, the engine torque reduction control is effective only for a short period of time, just sufficient to reduce the torque supplied by the engine at the time of engagement of clutch 11 or 12, respectively, that is, when the positive drive connection between the engine E from point A to the transmission at point B is being reestablished. Of course, the actual position of point B may be within the transmission itself, if the overrunning gear 10 is part of the transmission T. Thus, soft re-engagement of the positive drive, to provide for engine braking, is established, without jolts or shocks to the drive, interfering with smooth operation of the vehicle.

Various changes and modifications may be made within the scope of the inventive concept.

The transducers 20, 21 are shown with different numbers of teeth, for simplicity and by way of example, although, of course, both transducers may have the same number of teeth. The signal processing within the synchronizing stage can readily be arranged, electrically, to match different frequencies of operation derived from the outputs of the respective transducers 20, 21, or the number of teeth of the respective transducers can be so arranged that inherent changes in the transmission ratio between points A and B, for example due to intervening reduction gearing, is automatically compensated.

I claim:

1. In an automotive vehicle, an automotive drive system having a drive train including
    an engine (E) and free-wheeling means (10, 11, 12) for interrupting positive drive connection between the engine and a gear transmission (T) to permit free-wheeling operation of the vehicle;
    vehicle acceleration signal generating means (15, 16) for generating a vehicle acceleration signal;
    vehicle retardation signal generating means (17) for generating a vehicle retardation signal;
    free-wheeling control means (13, 14) operatively connected to said free-wheeling means (10, 12), responsive to said vehicle acceleration signal and to said vehicle retardation signal, respectively.
        (a) for enabling the free-wheeling means in the drive train of the vehicle, in response to a vehicle acceleration signal, and
        (b) disabling the free-wheeling means in the drive train of the vehicle and reestablishing positive drive connection between the engine and the transmission of the vehicle in response to a vehicle retardation signal generated by said vehicle retardation signal generating means;
    engine torque control means (23) controlling output torque of the engine;
    engine output speed sensing means (20) providing an engine speed signal;
    transmission speed sensing means (21) providing a transmission speed signal,
    means (22) for sensing a predetermined relationship of the engine speed signal and the transmission speed signal to determine when the engine speed, represented by said engine speed signal, approaches the transmission speed, represented by the transmission speed signal and resulting in a predetermined relationship approaching synchronism between said speeds,
    and wherein
    the engine torque control means (23) are connected to and controlled by the vehicle retardation signal generating means (17) and operative for controlling torque output of the engine to reduce engine torque during disabling of the free-wheeling means to provide for "soft" transition from free-wheeling to positive drive of the drive train.

2. System according to claim 1, wherein said relationship sensing means comprises synchronism sensing means (22) coupled to said engine speed sensing means (20) and to said transmission speed sensing means (21) and responsive respectively to said engine speed signal and to the transmission speed signal,
    said synchronism sensing means sensing when the engine output speed, as represented by the engine speed signal, approaches the transmission speed, as represented by the transmission speed signal and said signals have a predetermined relationship indicative of at least approximate synchronism of said speeds.
    the vehicle retardation signal means controlling the engine torque control means to reduce engine torque just prior to synchronism between the engine speed and the transmission.

3. System according to claim 1, including timing means (19, 19') connected between said vehicle acceleration signal generating means and the free-wheeling control means and, respectively, vehicle retardation signal generating means (17) and the free-wheeling control means to reduce spurious engagement and disengagement of the free-wheeling means (10, 11, 12) upon momentary occurrence of either vehicle acceleration, or retardation signals.

4. System according to claim 1, wherein the vehicle retardation signal generating means comprises a brake light switch (17);
    and said engine torque control means (23) is connected to and controlled by said brake light switch (17).

5. System according to claim 1, wherein the engine torque controller controls an ignition system (24) of the engine, and engine torque is reduced by retarding the ignition as controlled by the ignition system.

6. System according to claim 1, wherein the engine torque controller controls a fuel supply system (25), and engine torque is reduced by reducing the supply of fuel to the engine.

7. In an automotive vehicle, an automotive drive system having a drive train including
    an engine (E) and free-wheeling means (10, 11, 12) for interrupting positive drive connection between the engine and a gear transmission (T) to permit free-wheeling operation of the vehicle;

vehicle acceleration signal generating means (15, 16) for generating a vehicle acceleration signal;

vehicle retardation signal generating means (17) for generating a vehicle retardation signal;

free-wheeling control means (13, 14) operatively connected to said free-wheeling means (10, 12), responsive to said vehicle acceleration signal and to said vehicle retardation signal, respectively.
  (a) for enabling the free-wheeling means in the drive train of the vehicle, in response to a vehicle acceleration signal, and
  (b) disabling the free-wheeling means in the drive train of the vehicle and reestablishing positive drive connection between the engine and the transmission of the vehicle in response to a vehicle retardation signal generated by said vehicle retardation signal generating means;

engine torque control means (23) controlling output torque of the engine;

engine output speed sensing means (20) providing an engine speed signal;

transmission speed sensing means (21) providing a transmission speed signal, means (22) for sensing a predetermined relationship of the engine speed signal and the transmission speed signal to determine when the engine speed, represented by said engine speed signal, approaches the transmission speed, represented by the transmission speed signal and resulting in a predetermined relationship approaching synchronism between said speeds, and wherein
  the engine torque control means (23) are operative for controlling torque output of the engine to reduce engine torque during reestablishment of positive drive connection between the engine (E) and the gear transmission (T) of the vehicle to provide for "soft" transition from free-wheeling to positive drive of the drive train.

8. System according to claim 7, wherein said relationship sensing means comprises synchronism sensing means (22) coupled to said engine speed sensing means (20) and to said transmission speed sensing means (21) and responsive respectively to said engine speed signal and to the transmission speed signal,
  said synchronism sensing means sensing when the engine output speed, as represented by the engine speed signal, approaches the transmission speed, as represented by the transmission speed signal and said signals have a predetermined relationship indicative of at least approximate synchronism of said speeds,
  the vehicle retardation signal means controlling the engine torque control means to reduce engine torque just prior to synchronism between the engine speed and the transmission.

9. In an automotive vehicle having a drive train including
  an engine (E) and free-wheeling means (10, 11, 12) for interrupting positive drive connection between the engine and a gear transmission (T) to permit free-wheeling operation of the vehicle;
  vehicle acceleration signal generating means (15, 16) for generating a vehicle acceleration signal;
  vehicle retardation signal generating means (17) for generating a vehicle retardation signal;
  free-wheeling control means (13, 14) operatively connected to said free-wheeling means (10, 12), responsive to said vehicle acceleration signal and to said vehicle retardation signal, respectively,
    (a) for enabling the free-wheeling means in the drive train of the vehicle, in response to a vehicle acceleration signal, and
    (b) disabling the free-wheeling means in the drive train of the vehicle and reestablishing positive drive connection between the engine and the transmission of the vehicle in response to a vehicle retardation signal;
  engine speed sensing means (20) providing an engine speed signal;
  transmission speed sensing means (21) providing a transmission signal,
  and comprising, in accordance with the invention
  a method to reduce operating jolt of the vehicle upon transition from operation in which the free-wheeling means is enabled to operation in which the free-wheeling means is disabled and while the operation of the engine changes from accelerating to engine braking conditions, including the steps of
  sensing transition of operation of the vehicle from freewheeling to disabled or positive drive connection; and controlling torque output of the engine (E) to reduce engine torque during disabling of the free-wheeling means and when the engine speed, upon acceleration approaches the transmission speed and has a predetermined relationship close to synchronism therewith.

10. Method according to claim 9, wherein said step of sensing disabling of free-wheeling operation comprises sensing generation of the vehicle retardation signal.

11. Method according to claim 9, wherein the step of sensing vehicle retardation comprises sensing the state of operation of a brake light switch (17), said brake light switch forming the vehicle retardation signal generating means.

12. Method according to claim 9, including the step of determining approach of engine speed to synchronism with transmission speed;
  and wherein said step of controlling torque output of the engine is carried out shortly before synchronism between said speeds is determined.

13. Method according to claim 9, wherein the step of determining approach of said speeds to synchronism comprises determining, in a synchronizing stage (22) having said engine speed signal and said transmission speed signal applied thereto, if said speeds differ by a given and small percentage and the step of controlling engine torque comprises reducing torque output of the engine upon occurrence of said given and small percent difference in speeds.

14. Method according to claim 9, wherein the step of controlling torque output of the engine in a direction to reduce engine torque comprises retarding an ignition instant of engine ignition.

15. Method according to claim 9, wherein the step of controlling torque output of the engine in a direction to reduce engine torque comprises reducing the amount of fuel supplied to the engine.

16. In an automotive vehicle having a drive train including
  an engine (E) and free-wheeling means (10, 11, 12) for interrupting positive drive connection between the engine and a gear transmission (T) to permit free-wheeling operation of the vehicle;
  vehicle acceleration signal generating means (15, 16) for generating a vehicle acceleration signal;

vehicle retardation signal generating means (17) for generating a vehicle retardation signal;

free-wheeling control means (13, 14) operatively connected to said free-wheeling means (10, 12), responsive to said vehicle acceleration signal and to said vehicle retardation signal, respectively, (a) for enabling the free-wheeling means in the drive train of the vehicle, in response to a vehicle acceleration signal, and (b) disabling the free-wheeling means in the drive train of the vehicle and reestablishing positive drive connection between the engine and the transmission of the vehicle in response to a vehicle retardation signal;

engine speed sensing means (20) providing an engine speed signal;

transmission speed sensing means (21) providing a transmission signal, and comprising, in accordance with the invention a method to reduce operating jolt of the vehicle upon transition from operation in which the free-wheeling means is enabled to operation in which the free-wheeling means is while disabled and/the operation of the engine changes from accelerating to engine braking conditions, including the steps of sensing transition of operation of the vehicle from free-wheeling to disabled or positive drive connection; and controlling torque output of the engine (E) to reduce engine torque during disabling of the free-wheeling means and when the engine speed, upon acceleration approaches the transmission speed and has a predetermined relationship close to synchronism therewith.

17. Method according to claim 16, including the step of determining approach of engine speed to synchronism with transmission speed;

and wherein said step of controlling torque output of the engine is carried out shortly before synchronism between said speeds is determined.

18. Method according to claim 16, wherein the step of determining approach of said speeds to synchronism comprises determining, in a synchronizing stage (22) having said engine speed signal and said transmission speed signal applied thereto, if said speeds differ by a given and small percentage and the step of controlling engine toreque comprises reducing torque output of the engine upon occurrence of said given and small percent difference in speeds.

* * * * *